United States Patent
Santho

[11] 3,996,861
[45] Dec. 14, 1976

[54] NAILABLE METAL POST AND STRAP ANCHOR STRUCTURE

[76] Inventor: Albert T. Santho, 1920 Brandywine Drive, Columbus, Ohio 43220

[22] Filed: Oct. 23, 1975

[21] Appl. No.: 625,018

[52] U.S. Cl. .......................... 105/480; 105/409; 160/368 G
[51] Int. Cl.² ................. B60P 7/08; B60P 7/16; B61D 45/00; B61D 49/00
[58] Field of Search ........ 105/409, 423, 478, 479, 105/480, 486, 488; 160/368 G

[56] References Cited
UNITED STATES PATENTS

| | | | |
|---|---|---|---|
| 3,068,967 | 12/1962 | Oakley | 105/409 X |
| 3,335,522 | 8/1967 | Bruning | 160/368 G X |
| 3,704,672 | 12/1972 | Santho | 105/480 |
| 3,824,931 | 7/1974 | Hutchinson | 60/368 G X |

*Primary Examiner*—Robert G. Sheridan
*Assistant Examiner*—Howard Beltran
*Attorney, Agent, or Firm*—William S. Rambo

[57] ABSTRACT

A nailable metal post and strap anchor for a railroad freight car or other freight-transporting vehicle having a flush interior wall structure. The post comprises relatively interfitting channel members arranged to define a series of transversely and longitudinally spaced, nail-clinching slots between the channel side walls with a face plate arranged in closing relation to the interfitting channel members and having nail-receiving apertures aligned with the nail-clinching slots of the channel members, and provided with strap anchoring lugs or eyes between the transversely spaced nail-receiving apertures. The post provides an operative inner face which may be arranged in smooth, flush relation to the inner wall surface of the freight-transporting vehicle.

6 Claims, 9 Drawing Figures

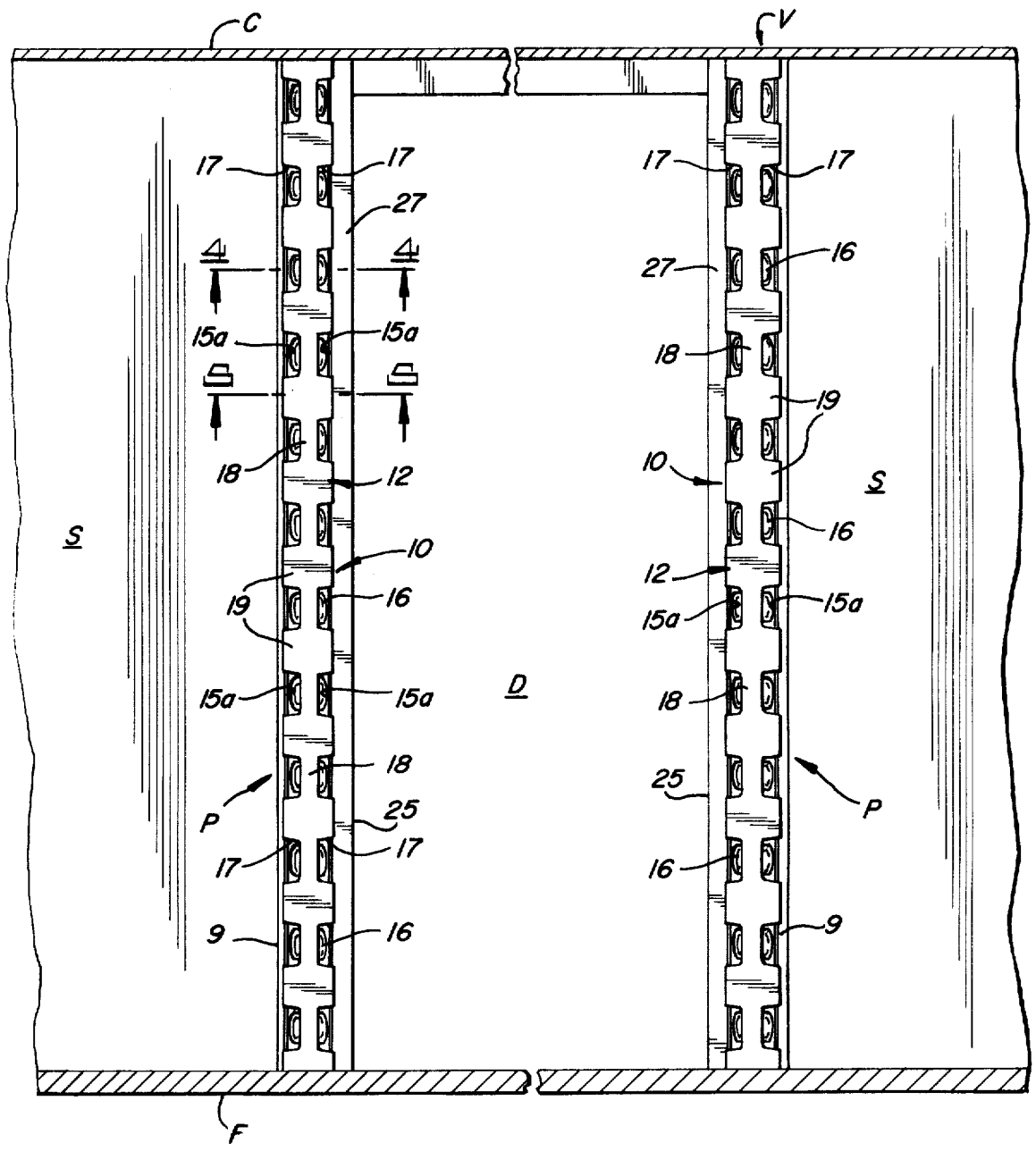

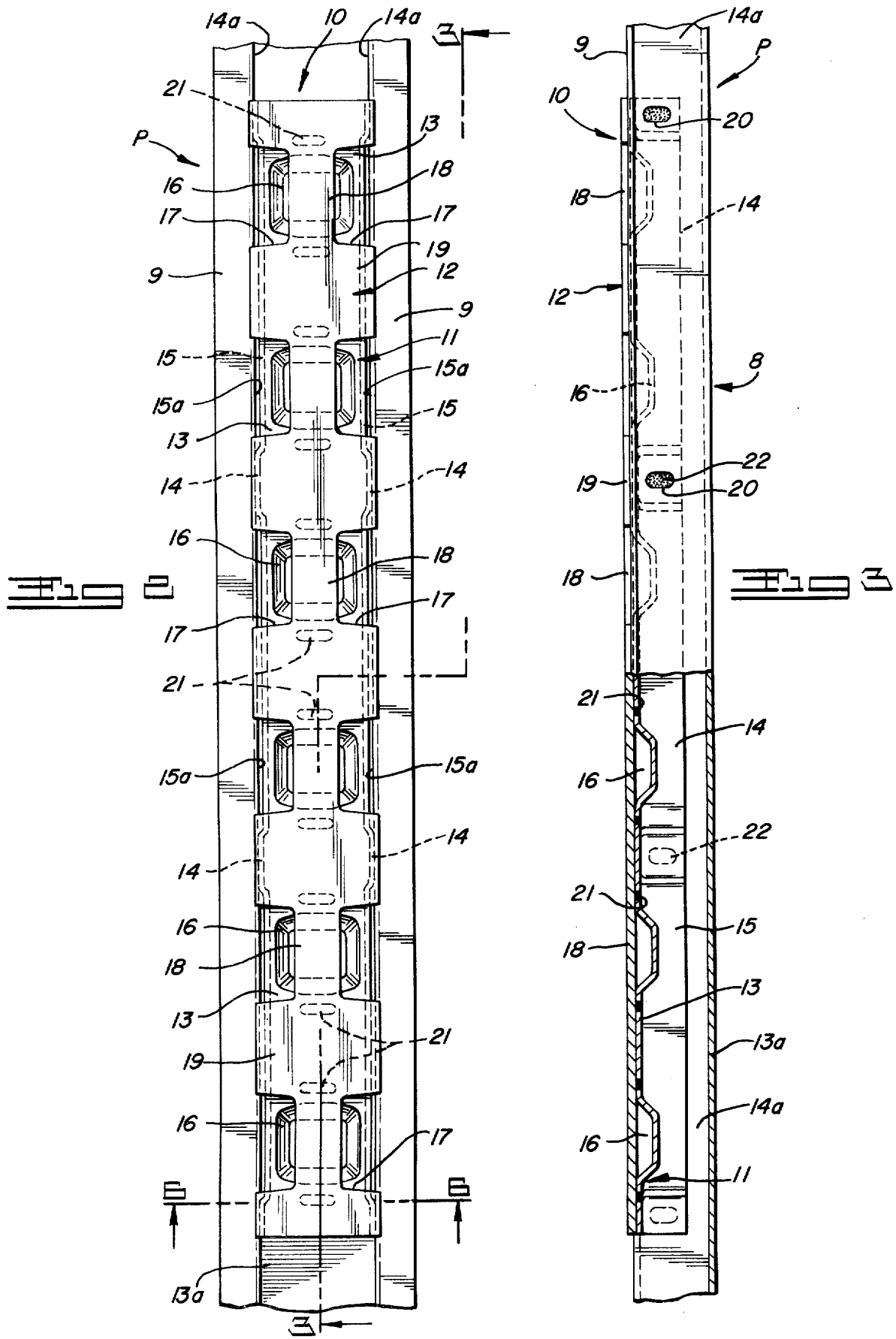

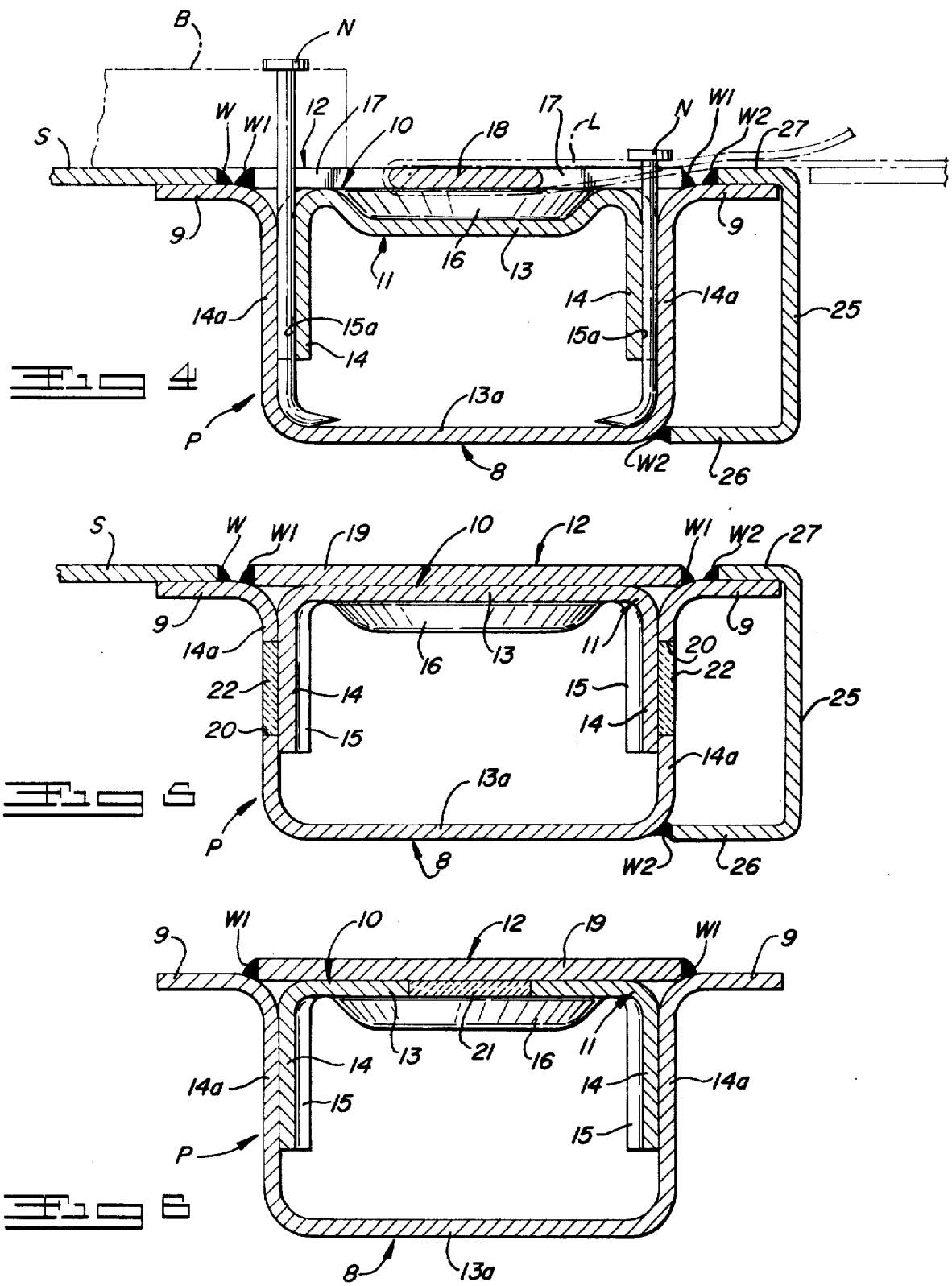

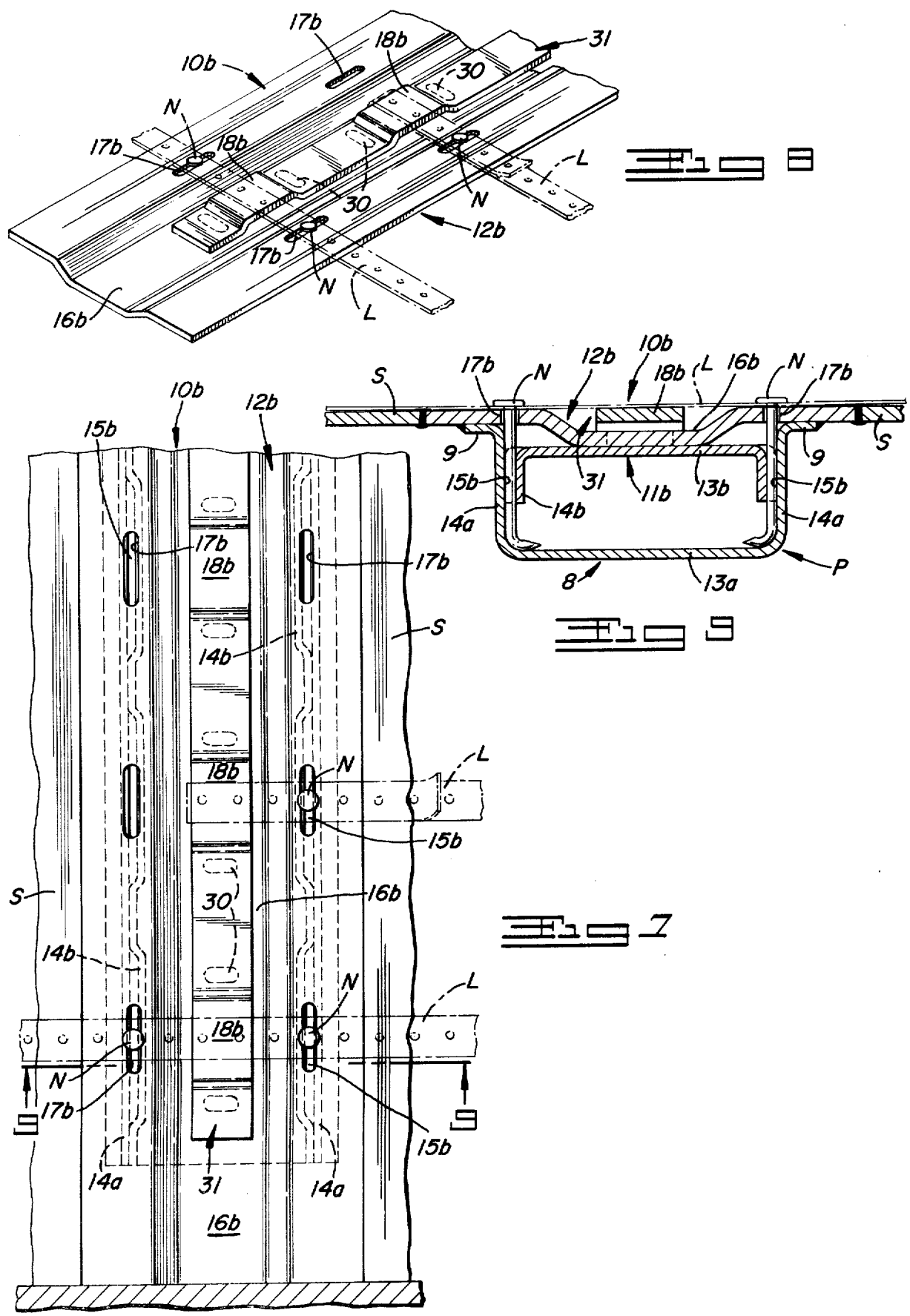

NAILABLE METAL POST AND STRAP ANCHOR STRUCTURE

BACKGROUND OF THE INVENTION:

This invention relates generally to nailable metal posts or beams, and more particularly to an improved metal post and strap anchor for use in so-called flush wall freight-transporting cars or trailers. The present invention is an improvement upon the nailing posts shown in my prior U.S. Pat. No. 3,704,672 issued Dec. 5, 1972 and in U.S. Pat. No. 3,068,967 issued Dec. 18, 1962 to Oakley.

Present day freight cars and truck trailers are usually constructed to provide smooth, uninterrupted metal walls whose inner surfaces are devoid of protuberances, cracks and crevices, and with the structural columns, studs, beams and door posts located exteriorly of the walls of the car or trailer vehicle. These cars are referred to as "flush wall" cars and have become very popular with the railroads, especially for shipping grain or similar bulk materials.

While the nailable metal posts disclosed in the aforesaid prior art patents are satisfactory for their intended use, they are not particularly adaptable for use in present day "flush-wall"-type freight-transporting vehicles, and are more complicated to manufacture and install then are the improved nailing posts of the present invention.

SUMMARY OF THE INVENTION:

The present invention provides an elongated anchor bar insert assembly which is welded in the channel of an outer post or column of "hat"-shaped cross sections, so as to provide nail receiving slots opening interiorly of the freight vehicle into which nails may be forcibly driven to secure lading straps, wooden blocks, or other nailable members to the metal post. The insert assembly also provides a series of anchoring eyes or loops which are substantially flush with the inner wall surface of the vehicle, and to which may be secured flexible ropes, bands, chains, or barrier wall straps.

The principal object of this invention is to provide a nailable metal post and strap anchor of simplified design and construction which is particularly adaptable for use in "flush wall"-type freight-transporting cars or vehicles.

BRIEF DESCRIPTION OF THE DRAWINGS:

FIG. 1 is a fragmentary vertical sectional view through the interior of a freight car looking toward a door opening thereof and showing a pair of nailable metal posts according to this invention located on either side of the door opening.

FIG. 2 is an enlarged, fragmentary elevational view looking at the interior face of a nailing post according to this invention.

FIG. 3 is a view, partially in vertical section and partially in edge elevation, of the nailing post taken approximately along line 3—3 of FIG. 2.

FIG. 4 is an enlarged horizontal sectional view taken along line 4—4 of FIG. 1.

FIG. 5 is a similar view taken along line 5—5 of FIG. 1.

FIG. 6 is an enlarged horizontal sectional view taken along line 6—6 of FIG. 2.

FIG. 7 is a fragmentary face elevational view of a modified form of nailable metal post according to this invention.

FIG. 8 is a fragmentary perspective view of the face plate and anchor-bar components used in the modified nailable metal post of FIG. 7.

FIG. 9 is a horizontal sectional view taken along line 9—9 of FIG. 7.

DETAILED DESCRIPTION OF PREFERRED EMBODIMENTS:

With reference to FIG. 1, and to illustrate the application of the present invention, portions of a railroad box-car V are shown. In this example, the car V is shown as including a floor F, a roof or ceiling C, continuous vertical sheet metal side walls S, and a pair of metal door posts P. The posts P are located at each side of a doorway D, but it will be understood that the nailable metal posts of this invention may be used as exterior structural columns or beams located in any conventional position on the vehicle. The exterior location of the posts P is best indicated in FIGS. 4 and 5, and it will be noted that the thickness dimension of the posts extends exteriorly from the side walls S which define the interior compartment of the freight car V.

As shown particularly in FIGS. 4–6, the posts P are each made up of an outer, hat-shaped channel member 8 having laterally outwardly turned flanges 9 along each longitudinal edge thereof and to which may be welded, as at W, a vertical edge of the side wall sheathing S. An elongated, channel-shaped insert assembly 10 is carried in the outer channel member 8 and may be coextensive with the length or height of the post P, or may extend for only a portion of the length thereof. In the embodiment illustrated in FIGS. 1–6, the insert assembly includes only two members, namely, an inner channel member 11 and a face plate or anchor bar 12.

The inner channel member 11 includes a central base web 13 and opposite side walls 14 extending perpendicularly from the base web 13. The base web 13 of the inner channel member 11 is disposed in closing relation to the channel of the outer post member 8 and the side walls 14 extend into the channel of the outer post member in closely adjacent relation to the side walls or webs 14a thereof, but terminate short of the base web 13a of the outer post member 8.

As shown particularly in FIGS. 2 and 5, the side walls or legs 14 of the inner channel 11 are secured at longitudinally spaced intervals therealong to the side walls 14a of the outer post member 8 by means of plug welds 22 made through slots 20 formed in the side walls 14a of the outer post member 8. Between these welded areas 22, the walls or legs 14 of the inner channel member 11 are formed at longitudinally spaced intervals with longitudinally extended, inwardly depressed or recessed areas 15 disposed in slightly inwardly spaced relation to the adjacent surfaces of the side walls 14a of the outer post member 8. The spaces defined between the inwardly depressed areas 15 of the side walls 14 of the inner channel 11 and the adjacent areas of the side walls 14a of the outer member 8 provide a series of transversely and longitudinally spaced nail-clinching slots 15a into which nails N may be forcibly driven to secure various anchoring members, such as wood boards or blocks B, or flexible lading straps L (see FIG. 4), to the posts P. The base web 13 of the inner channel member 11 is also formed at longitudinally spaced intervals therealong with a series of generally rectangular recesses or depressions 16 whose purpose will be hereinafter explained.

The face plate and anchor bar 12 comprises generally an elongated, flat metal plate or strip which is formed at longitudinally spaced intervals with sets of transversely opposed notches 17. The notches 17 define on the face plate a plurality of relatively narrowed, longitudinally spaced apart, strap-anchoring clevises or lugs 18, as well as nail-receiving apertures aligned with the slots 15a. The reduced width lugs 18 of the face plate 12 are disposed in registry or alignment with the depressions 16 formed in the base web 13 of the inner channel member and thereby provide an easily accessible means about which a flexible lading strap L, or other flexible anchoring member, may be looped and secured by nailing, as illustrated in FIG. 4. The face plate 12 is secured in the aforesaid position on the inner channel member by a series of plug welds 21 made through slots formed in the base web 13 of the inner channel member. In this regard, it should be explained that the inner channel 11 and the face plate 12 are preferably assembled and welded together to form the insert assembly 10 prior to the installation thereof within the outer channel post 8. The insert assembly is then welded as a unit to the outer channel post 8 by the plug welds 22 and by seam welding the outer side edges of wider, unnotched areas 19 of face plate 12 to the edge flanges 9 of the outer channel post 8, as indicated at W1.

When the present nailable metal post is used as a door post, as indicated in FIGS. 1, 4 and 5, a generally shallow C-shaped channel iron 25 is used to trim the door opening and form a door jamb therefor. Toward this end, the opposite side legs 26 and 27 of the channel iron 25 may be seam welded, as at W2, to the base web 13a and the outermost edge flange 9, respectively, of the outer channel or post member 8.

FIGS. 7–9 illustrate a slightly modified metal nailing post and strap anchor according to this invention. This modified construction utilizes the same outer, hat-shaped channel post 8, but the insert assembly 10b differs from the insert assembly 10 of FIGS. 1–6, in that the opposite side legs 14b of the inner channel member 11b are relatively shorter, and instead of forming the face plate 12b with a series of spaced apart recesses or depressions, it is formed with a continuous, longitudinally and centrally extending, shallow recess or trough 16b. Also, rather than having the notched out apertures 17, the modified face plate 12b is formed with sets of transversely spaced apart nail-receiving slots or apertures 17b disposed in alignment with the nail-clinching slots 15b formed between the inwardly recessed areas 14b of the inner channel 11b and the side walls 14a of the outer channel post 8. The face plate 12b is also relatively wider than the outwardly turned edge flanges 9 of the outer channel post 8, so that the edges of the face plate may form a substantially continuous, flush welded joint with the adjoining edges of the wall sheathing S of the freight vehicle.

Extending centrally of the recess or trough 16b and secured therein by plug welds 30 is an elongated, corrugated strap anchor bar 31. The raised corrugations 18b of the bar 31 provide clevises or bights around or through which may be trained lading straps L or similar flexible lines or ropes.

In operation, the present nailable metal posts provide a working face and strap anchors arranged in substantially flush relation to the inner wall surface of the freight transporting car or vehicle and hence are particularly adapted for use in present day "flush wall" freight cars or trailers.

While preferred embodiments of this invention have been illustrated and described in detail, it will be understood that various modifications as to details of construction and design are possible without departing from the spirit of the invention or the scope of the following claims.

I claim:

1. In combination with an elongated, channel-shaped, outer post which includes a central base web, opposite side walls extending perpendicularly from said base web and terminating in opposite, laterally outwardly turned edge flanges disposed in substantially parallel relation to said base web; an elongated, channel-shaped insert positioned in the channel of said outer post and having a base web disposed in closing relation to the channel of said outer post and opposite side walls welded at intervals to the opposite side walls of said outer post, the side walls of said insert being formed at longitudinally spaced intervals with inwardly recessed areas disposed in slightly spaced relation to the adjacent surfaces of the side walls of said outer post, the inwardly recessed areas of the side walls of said insert defining with the adjacent surfaces of the side walls of said outer post a plurality of longitudinally spaced apart, nail-clinching slots opening outwardly of said post along each side of said insert; and an elongated face plate extending longitudinally of said post and secured to the outwardly turned edge flanges thereof, in at least partially covering relation to said insert, said face plate being formed at longitudinally spaced intervals with sets of transversely spaced apart nail-receiving apertures disposed in alignment with the nail-clinching slots formed between the side walls of said outer post and said insert.

2. The combination defined in claim 1, wherein a lading strap anchor is provided on said face plate between the transversely spaced apart nail-receiving apertures of said face plate.

3. The combination defined in claim 2, wherein said lading strap anchor is defined between notches formed in the longitudinal edge of said face plate.

4. The combination defined in claim 2, wherein said lading strap anchor comprises an elongated bar secured at longitudinally spaced intervals to said face plate and formed with plurality of outwardly bent, eye-forming lugs disposed in transverse alignment with the nail-receiving apertures of said face plate.

5. The combination defined in claim 1, wherein the side walls of said insert are of lesser depth than the side walls of said post and terminate in spaced relation to the base web of said post, whereby to cause nails driven into said nailing slots to contact the base web of said post and be bent laterally inwardly thereof.

6. The combination defined in claim 1, wherein the nail-receiving apertures of said face plate are defined by notches formed in the edges of said face plate, and wherein the base web of said insert is inwardly recessed in the areas of the notches formed in said face plate.

* * * * *